United States Patent [19]

Coates et al.

[11] Patent Number: 5,442,964
[45] Date of Patent: Aug. 22, 1995

[54] APPARATUS AND METHOD FOR MEASURING FORCE WITH STATIC ELECTRIC FIELD PRODUCED BY PIEZOID ELEMENTS

[75] Inventors: James A. Coates; James M. Gernert, both of Casper, Wyo.

[73] Assignee: CG&G Enterprises Limited Liability Company, Casper, Wyo.

[21] Appl. No.: 62,137

[22] Filed: May 14, 1993

[51] Int. Cl.$^6$ ............................................. G01L 1/00
[52] U.S. Cl. .................................. 73/862.68; 73/777; 73/DIG. 4
[58] Field of Search .................... 73/754, 777, 862.68, 73/DIG. 4

[56] References Cited

U.S. PATENT DOCUMENTS

| | | | |
|---|---|---|---|
| 3,440,873 | 4/1969 | Eichelberger | 73/862.68 |
| 4,480,488 | 11/1984 | Read et al. | 73/862.68 |
| 4,826,131 | 5/1989 | Mikkor | 251/129.17 |
| 4,873,871 | 10/1989 | Bai et al. | 73/777 |
| 4,995,261 | 2/1991 | Jacobser et al. | 73/777 |
| 5,191,237 | 3/1993 | Takabe | 73/777 |

Primary Examiner—Richard E. Chilcot, Jr.
Assistant Examiner—R. Biegel

Attorney, Agent, or Firm—Gary M. Polumbus; Holland & Hart

[57] ABSTRACT

A technique for measuring mechanical force by exploiting the static electric polarization developed by piezoid elements in response to application of mechanical pressure, the magnitude of the polarization being representative of the magnitude of the mechanical force applied to one or more piezoid elements by disposing the piezoid elements adjacent to an electron transmission medium capable of sustaining an electric field internally, in which the polarization developed by the piezoid elements repel particles of like charge from the adjacent surface of the transmission medium and attract particles of opposite charge to the adjacent surface. By supplying a current of charged particles to one end of the transmission medium and separately collecting the charged particles toward different surfaces of the transmission medium, the strength of the polarization, which is representative of the strength of the applied mechanical forces, can be measured. The technique can be used with a single piezoid element to measure a single mechanical force, such as mass or gauge or absolute pressure, or a plurality of piezoid elements to measure the net of a plurality of forces, such as differential pressure. The piezoid elements are shaped and mounted to enhance the integrity, accuracy and sensitivity of the apparatus.

32 Claims, 4 Drawing Sheets

Fig_5

Fig_7

Fig_10

Fig_11

APPARATUS AND METHOD FOR MEASURING FORCE WITH STATIC ELECTRIC FIELD PRODUCED BY PIEZOID ELEMENTS

FIELD OF THE INVENTION

This invention relates to an apparatus and method for measuring force with piezoid elements, and more particularly, to a technique for exploiting the static electric field generated by piezoid elements when subjected to force to measure the same.

BACKGROUND OF THE INVENTION

Piezoid materials, which include macrocrystalline substances such as quartz as well as composites of microcrystalline substances, develop a polarized electrical potential between their opposing surfaces when subjected to mechanical force. The strength of the electric potential developed between the opposing surfaces of the piezoid material is proportional to the strength of the mechanical force applied to the piezoid material. Because piezoid materials are highly sensitive to minute changes in pressure or force to which they are subjected, piezoid materials have been used in phonograph needles, microphones and other such force transducing devices. For example, U.S. Pat. No. 2,898,477 to Hoesterey describes a crystal microphone which translates sound into an electrical signal by exploiting the change in the magnitude of the electric potential developed between the faces of a piezoid material when subjected to mechanical forces in the form of acoustic waves.

In the device described by Hoesterey and other similar devices, the piezoid material, in the form of a symmetrical, thin quartz plate, is utilized as a dynamic force transducer, with the piezoid material employed as the dielectric material in a capacitor-type structure. In such a structure, conductive plates are applied to opposing surfaces of the piezoid material and, as the magnitude of the electric polarization charges between the opposing surfaces of the piezoid material changes in response to applied mechanical forces, unbound charged particles in the conductive plates respond to counterbalance the magnitude of the electric polarization between the opposing faces of the piezoid material. The reaction of the unbound charged particles in the conductive plates translates into an electrical signal representative of the acoustic waves to which the piezoid material is subjected.

As is the case with any capacitor-type structure, the output of the signal measured between the conductive plates decays to zero over time once sufficient unbound charged particles accumulate in the conductive plates to balance the electric potential across the dielectric, which in this case is a piezoid material. Accordingly, while such dynamic transducer devices are useful for measuring fluctuations in applied force over time, such devices are not useful for measuring a static force which does not change over time.

It is important to note that in force transducers using a piezoid material as the dielectric of a capacitor, even though the electric potential between the opposing faces of the piezoid material is counter-balanced by unbound charged particles in the conductive plates, causing the resulting signal to drop to zero, the potential developed across the piezoid material in response to a mechanical force remains constant. A piezoid material is an electret, and will retain the polarization of its dipolar electric field as long as an external, non-isotopic force is applied. Accordingly, a piezoid material has a measurable response to a constant, applied mechanical force, and this response can be used to determine the strength of the applied force. This is shown in devices such as those disclosed in U.S. Pat. No. 3,761,784 to Jund and U.S. Pat. No. 4,791,471 to Onodera et al. In each of those references, a piezoid material is physically disposed to act as the gate of a transistor. As a result, when the piezoid material is subjected to mechanical force, the electric potential between opposing surfaces of the piezoid material changes, and the resultant effective surface charge at the gate of the transistor changes, controlling the conductance of the channel of the transistor. Accordingly, the response of the transistor is proportional to the mechanical force applied to the piezoid material which acts as the gate to the transistor.

In these references, as well as in U.S. Pat. No. 4,378,510 to Bennett, a specially doped semiconductor region was directly mounted on the piezoid material. As shown in Bennett, N-type and P-type regions were created to create the transistor channel. However, the necessity of having both N type and P type regions creates some complexity in the manufacture of such devices.

It is against this background that even further significant improvements have evolved per the present invention in the field of measuring mechanical forces with piezoid materials.

SUMMARY OF THE INVENTION

The present invention is directed towards an apparatus and method for measuring the magnitude of an applied mechanical force using piezoid elements, wherein the piezoid elements develop a polarized, static electric potential between their opposing surfaces, the magnitude of the electric potential being proportional to the magnitude of the mechanical force applied. The technique disclosed employs an electron transmission medium capable of maintaining an electric field internally, such as a semiconductor wafer or an electron beam vacuum tube, the transmission medium having a plurality of faces and opposing longitudinal ends. Piezoid elements are disposed at one or more of the faces of the transmission medium. The technique measures the strength of the mechanical force applied to the piezoid element by supplying a current of charged particles to a first longitudinal end of the transmission medium, and collecting the charged particles separately toward different faces of the transmission medium at an opposite longitudinal end. The magnitude of the electric polarization developed by the piezoid elements in response to the applied mechanical force causes particles of like charge to be repelled away from the adjacent face of the transmission medium and causes particles of opposite charge to be attracted toward the adjacent face. Because the strength of the electric field developed between the faces of each of the piezoid elements is related to the strength of the mechanical forces applied thereto, the extent to which particles of like charge are repelled from the adjacent surface and particles of opposite charge are attracted toward the adjacent face is proportional to the strength of the mechanical forces applied to the piezoid elements. The forces can then be measured by measuring the charged particles, in the form of electrical current, which accumulate toward the different faces of the transmission medium at the opposite longitudinal end of the transmission medium from which the charged particles were introduced.

Pursuant to the technique of the present invention, a plurality of piezoid elements may be used for measuring the net resultant force of a plurality of mechanical forces such as differential pressure. Alternatively, a single piezoid element may be used for measuring mechanical forces such as gauge or absolute pressure or for measuring the mass of an object.

Another aspect of the present invention is to seal the piezoid elements and the transmission medium in a housing whereby the transmission medium will be isolated from the source of the applied mechanical force so that the transmission medium will not be affected by the direct application of mechanical force. If, for example, a semiconductor wafer is used as a transmission medium, when exposed to mechanical force, the semiconductor wafer itself may exhibit piezoelectric effects in response to applied force which may effect the accuracy of the apparatus. It is a further aspect of the present invention to seal the piezoid elements from the source of the applied mechanical force to protect the piezoid elements from destructive effects which may be inherent in the source of the mechanical force, whether the effect is mechanical or chemical.

Another aspect of the present invention is to use frusto-conically shaped piezoid elements, mounted in frusto-conically shaped openings in the housing, the narrower ends of both the piezoid elements and the openings being disposed at the adjacent face of the transmission medium. Depending on the geometry of the piezoid elements, the frusto-conical shape can be exploited so as to magnify the strength of the electric potential developed by the piezoid elements between their opposing surfaces by exploiting the normal compressive forces exerted on the sloping sides of the frusto-conical piezoid elements as a function of the slope angle of the side surfaces, surface diameter and thickness of the piezoid elements. Also, use of the frusto-conical shape ensures that the application of applied mechanical force will improve the seal between the piezoid elements and the housing, because the application of force will only wedge the piezoid element more tightly against the housing. Also, in a preferred embodiment, a compressible, low-friction elastomeric coating is disposed between the piezoid elements and the housing. If the piezoid elements are compressed by applied mechanical forces and, due to friction, cannot regain their unstressed form once the mechanical force is removed, a latent polarization of the piezoid elements would result, reducing the accuracy of the apparatus. Use of the elastomeric coating will lessen the possibility of hysteresis effects by reducing friction between the piezoid elements and the housing and allowing the piezoid elements to more easily regain their unstressed form. Further, the slope angle of the piezoid elements, as measured from a reference plane perpendicular to the opposing surfaces of the piezoid elements, can be made greater than the internal angle of friction between the elastomeric coating and the lateral surface of the frusto-conically shaped piezoid elements to further reduce the possibility of such hysteresis effects.

A more complete appreciation of the present invention and its scope can be obtained from understanding the accompanying drawings, which are briefly summarized below, the following detailed description of a presently preferred embodiment of the invention, and the appended claims.

DETAILED DESCRIPTION OF THE DRAWINGS

Figure 1:
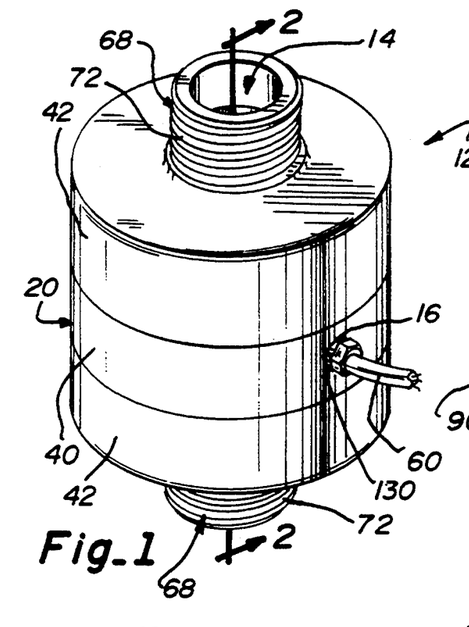
FIG. 1 is a perspective view of a piezoelectric force transducer in accordance with the present invention for use in sensing differential pressure.
Figure 2:
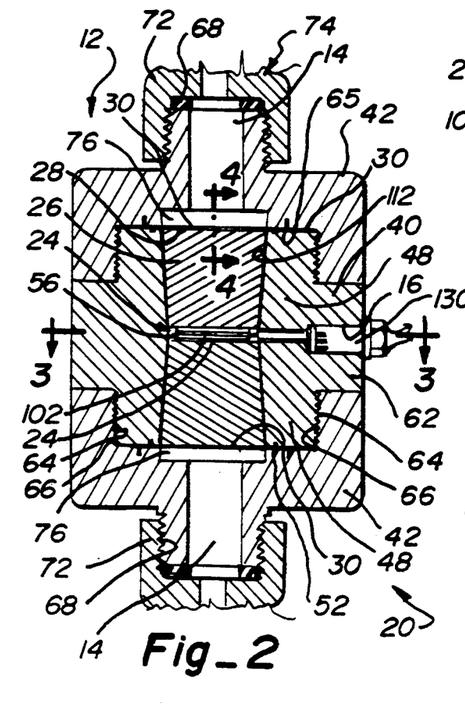
FIG. 2 is a cross-sectional view of the transducer taken along line 2—2 of FIG. 1.
Figures 5, 7:
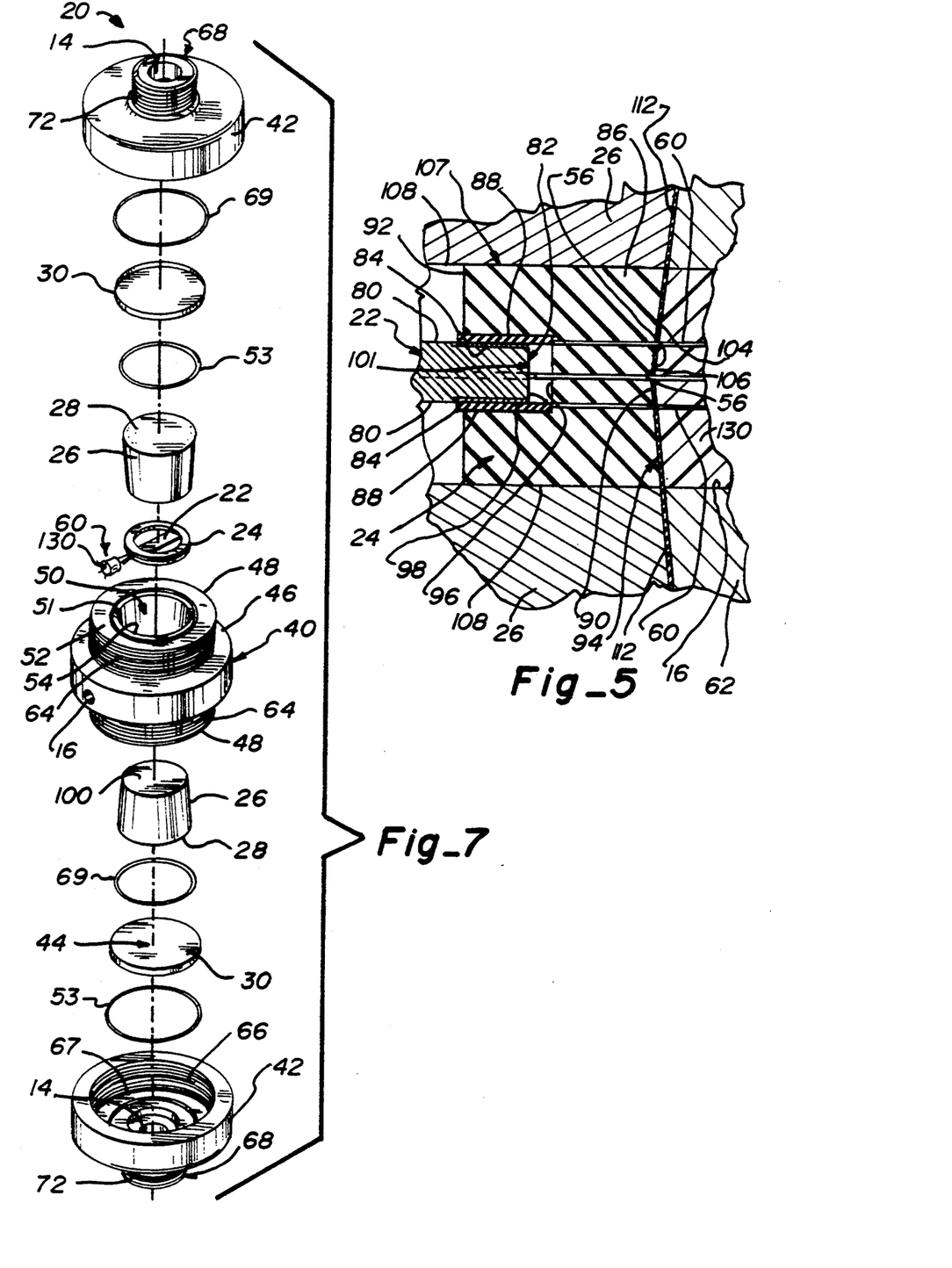
FIG. 5 is an enlarged fragmentary cross-sectional view of the semiconductor wafer of the transducer of FIG. 1 mounted in a wafer holder taken along line 5—5 of FIG. 3.
FIG. 7 is an exploded perspective view of the transducer shown in FIG. 1.
Figure 6:
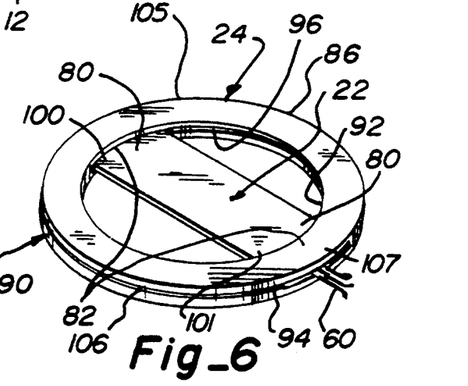
FIG. 6 is an enlarged view of the semiconductor wafer of the transducer of FIG. 1 mounted in the wafer holder.

A preferred embodiment of the present invention, as shown in FIG. 1, may be a differential pressure transducer 12. The differential pressure transducer 12 is contained in a housing 20 which supports the other components of transducer 12 and provides channels 14 through which pressure can be applied and an electrical access opening 16 through which electrical connections can be made to the operative components of the transducer 12. As shown in FIGS. 5 and 6, the transducer 12 includes a semiconductor wafer 22, mounted in a wafer holder 24 which physically supports the wafer 22 between two piezoid elements 26 disposed at opposing ends of the housing 20 as shown in FIGS. 2 and 7. The wafer holder 24 also provides for electrical connection between the wafer 22 and the external environment by means of electrical conductors 60 extending through the electrical access opening 16 as will be more fully described hereinafter. The outward facing surfaces 28 of the piezoid elements 26 are covered by protective seals 30.

The housing 20, with reference to FIGS. 1, 2 and 7, is generally cylindrical and includes three sections comprising a main body 40 and two identically-shaped end caps 42. The main body 40 and the end caps 42 each have a generally circular cross-section taken along a vertical axis 44 (as shown in FIG. 7) of the transducer, a cross-section of the main body 40 being shown in FIG. 3.

The main body 40 of the housing 20, with reference to FIG. 7, has a midsection 46 and two threaded end sections 48, the outer circumference of the midsection 46 being larger than that of the threaded end sections 48. The main body 40 provides three openings therein. Generally symmetrical end openings 50 formed by a centrally disposed channel through the main body 40 are disposed on each of two outer end surfaces 52 of the main body 40. As will be further described below in connection with the piezoid elements 26, the end openings 50 are frusto-conically shaped, having tapered, sloping inner surfaces 54, sloping inwardly toward a peaked midpoint 56 of the main body 40 where they join, as seen in FIGS. 2 and 5. The third opening, as shown in FIGS. 2, 3, 5 and 7, is an electrical access opening 16 which allows for electrical conductors 60 to pass sealably through a lateral side 62 of the midsection 46 of the main body 40 and be connected to the wafer holder 24. The electrical conductors 60 ultimately are electrically connected to the semiconductor wafer 22, as will be further described below. As shown in FIG. 7, the oppositely disposed end sections 48 of the main body 40 have threaded outer lateral surfaces 64. The threaded outer lateral surfaces 64 of the end sections 48 engage matched threaded inner surfaces 66 of the end caps 42, as will be further described below.

Figure 4:
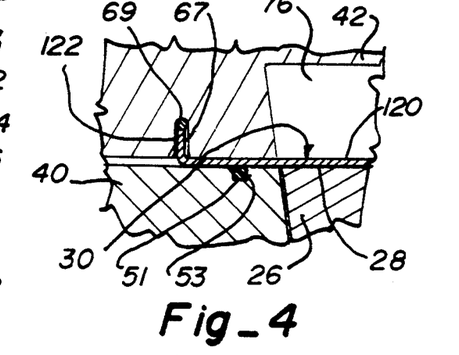
FIG. 4 is an enlarged fragmentary cross-sectional view of an upper surface of a piezoid element of the transducer of FIG. 1 taken along line 4—4 of FIG. 2.

Each of the outer end surfaces 52 of the end sections 48 of the main body 40 also contains an outward-facing circular groove 51 centrally-disposed about the end-opening 50, as shown in FIGS. 4 and 7. The outward-facing circular groove 51 receives a compressible, elastomeric O-ring gasket 53 used for securing and sealing the protective seals 30. The size of the groove is deep enough to properly seat and accommodate the O-ring gasket 53 so that the O-ring gasket 53 supports the protective seal 30 only a very slight distance above the surface of the piezoid element 26.

The end caps 42 of the main body 40, as shown in FIG. 2, have a generally squared-off, Y-shaped cross-section in the plane of the vertical axis 44 of the transducer 12. The lower one of the end caps 42 is shown as having an upright, generally Y-shaped cross-section, and the upper one of the end caps 42 as having an inverted Y-shaped cross-section. Portions of the Y-shaped structure of the end caps 42 define a threaded cap for the end sections 48 of the main body 40. As previously stated, the vertically-disposed inner surfaces 66 of the end caps 42 are threaded to match and engage the vertically-disposed threaded outer lateral surfaces 64 on the end sections 48 of the main body 40 of the housing 20.

With reference to FIGS. 4 and 7, an inward-facing surface 65 of each end cap 42 contains an inward-facing circular groove 67 centrally-disposed about the channel 14. Like the outward-facing circular groove 51 in the end surfaces 52 of the main body 40, the inward-facing groove 67 receives a compressible gasket 69 for securing and sealing against the protective seals 30. However, as will be further discussed below, the inward-facing circular groove 67 in the end caps 42 and the compressible gasket 69 to be disposed therein are larger in diameter than the outward-facing circular groove 51 in the end surfaces 52 of the main body 40 and the O-ring gasket 53 to be disposed therein, as shown in FIG. 4.

The end caps 42 and the main body 40 fit together in a screw tight relationship as shown in FIG. 2. The end caps 42 are screw-fitted onto the main body 40 of the housing 20 after the semiconductor wafer 22, the wafer holder 24, the piezoid elements 26, the O-ring gaskets 53 (installed within the outward-facing grooves 51) and the protective seals 30 have been installed in the main body 40, and the compressible gaskets 69 have been installed within the inward-facing grooves 67 in the end caps 42.

As shown in FIGS. 1, 2 and 7, the base portion of the generally Y-shaped end caps 42 comprises a pressure fitting 68 having a hollow channel 14 extending through the end caps 42 along the vertical axis 44 of the transducer. The hollow channels 14 allow external pressure to be directed therethrough to the end openings 50 in the main body 40 of housing 20, ultimately applying a source of pressure to the piezoid elements 26 mounted therein.

With reference to FIGS. 2 and 7, vertically-disposed outer surfaces 72 of the pressure fittings 68 are outwardly threaded to allow a thread-fit connection to a pressure source 74 to be measured. With reference to FIGS. 2 and 4, adjacent at an end of the pressure fitting 68 closest the main body 40 of the housing 20, the channel 14 opens to a chamber 76 wider in cross sectional than the channel 14, the chamber 76 being wide enough to extend fully across the end openings 50 in the main body 40. As will be further appreciated, the widening of the channel 14 into the chamber 76 allows pressure introduced into the channel 14 to be more evenly distributed over the entire outer-facing surface 28 of the piezoid elements 26 (through the pressure seals 30) so as to more evenly expose the piezoid elements 26 to pressure and ultimately generate a more representative electric field with which to measure the force applied thereto.

Figure 3:
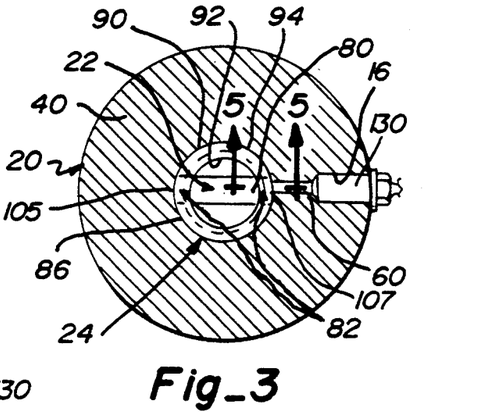
FIG. 3 is a horizontal cross-sectional view of the transducer taken along line 3—3 of FIG. 2.

The semiconductor wafer 22, as shown in FIGS. 3 and 6, may be a generally rectangular-shaped slice of doped semiconductor material. The wafer 22 has two opposing faces 80. The wafer 22 is comprised of a single-type semiconductor material, and is not a composite semiconductor. In other words, it does not have both an N-type region or regions and a P-type region or regions, but may be either one of an N-type or P-type. In the preferred embodiment, the wafer 22, which may comprise a substrate of doped silicon, gallium arsenide or other suitable semiconductor material, is an N-type material, conventionally doped with a material such as phosphorous whose atoms have one more electron in the outermost shell than is required to satisfy the bonds to adjacent atoms in the semiconductor, and whose atoms are compatible in size with those in the lattice structure of the semiconductor material selected.

At each longitudinal end 82 of the rectangular wafer 22, metal contacts 84 of gold or other suitable conducting materials are precisely deposited on both opposing faces 80 of the wafer 22 (FIG. 5). Accordingly, in the preferred embodiment, there are four metal contacts 84 vapor deposited, two each on each of the opposing faces 80 of the wafer 22 at both longitudinal ends 82.

It must be noted that before the metal contacts 84 are deposited on the opposing faces 80 of the wafer 22, the opposing faces 80 must be polished so that the surface roughness of the opposing faces 80 is substantially equal. If the surface roughness of the opposing faces 80 is not substantially equal, the quantum barriers between the metal contacts 84 and the surfaces of the opposing faces 80 will be different, causing an unequal flow of charged particles between the opposing faces 80 of the wafer 22 and the metal contacts 84 deposited thereon, detracting from the accuracy of the apparatus. Also, the metal contacts 84 must be applied so that the metal contacts 84 on the opposing faces 80 of the wafer 22 are precisely equally aligned along the length of the wafer 22. If the metal contacts 84 are not precisely aligned, the relaxation of the charged particles flowing through the wafer 22 once beyond the applied electric field generated by the piezoid elements 26 will also undermine the accuracy of the apparatus. Although perfect alignment is desirable, no appreciable degradation of the accuracy of the apparatus should result if the metal contacts 84 on the opposing faces 80 of the wafer 22 are aligned within the best submicron tolerances currently employed in semiconductor manufacturing technology as measured along the length of the wafer 22.

It should be noted that the semiconductor wafer 22 itself should be of a thickness as thin as practicable between its opposing faces 82 in order to enhance the effect of externally-applied electric fields on the flow of current within the semiconductor wafer 22. The effect of externally-applied electric fields to the flow of current through the wafer 22 will diminish with increasing thickness of the wafer 22, therefore, the wafer 22 cannot be so thick as to undermine the effectiveness of the transducer 12. In the preferred embodiment, it has been found that a standard wafer thickness on the order of 0.015 inches, works well. It may be nevertheless desirable to use a thicker wafer for improving mechanical rigidity and durability for applications in which vibration or other stresses are expected, or, alternatively, to use a thinner wafer to optimize sensitivity for applications where additional mechanical rigidity is not needed. It should also be noted that the rectangular shape of the semiconductor wafer 22 chosen is for purposes of ease of assembly, and not as a consequence of any particular desirable electrical properties of the shape.

The wafer 22 is supported by a flexible, non-conducting wafer holder 24 as shown in FIGS. 3, 5 and 6. The wafer holder 24 comprises a flexible, self-supporting slotted ring 86, four electrical contacts 88 and three electrical conductors 60 extending through the side 90 of the flexible ring 86.

The flexible ring 86 of the wafer holder 24 is in the shape of a generally circular disc as shown in FIG. 6. However, as shown in FIG. 5, the vertically-disposed inner circumference 92 and vertically-disposed outer circumference 94 of the flexible ring 86 are not planar. The inner circumference 92, as shown in FIG. 5, has a centrally-disposed inward-facing slot 96, having opposing surfaces 98, which receives the longitudinal ends 82 of the semiconductor wafer 22. Electrical contacts 88 are disposed on the opposing surfaces 98 within the slot 96. The electrical contacts 88 only extend partly around the circumference of the ring 86 within the slot 96, extending far enough around the circumference of the ring 86 to make contact with the longitudinal ends 82 of the wafer 22 at the metal contacts 84 thereof. This is because the electrical contacts 88 in the slot 96 are intended to engage different metal contacts 84 on opposing longitudinal ends 82 of the wafer 22. Generally, it has been found that having the electrical contacts 88 extend through opposing 120° arcs around the slot should provide adequate contact.

Electrical conductors 60, are electrically connected to the electrical contacts 88 in the slot 86 of the wafer holder 24 as shown in FIG. 5. The electrical conductors 60, which are insulated to allow the wires to be manipulated without concern for short-circuiting each other, may comprise a relatively thin-gauge wire because they will not need to carry large currents. The conductors 60 pass through small openings made in the side 90 of the flexible ring 86 of the wafer holder 24 and are electrically connected to the electrical contacts 88 in a conventional manner such as soldering.

Figure 8:
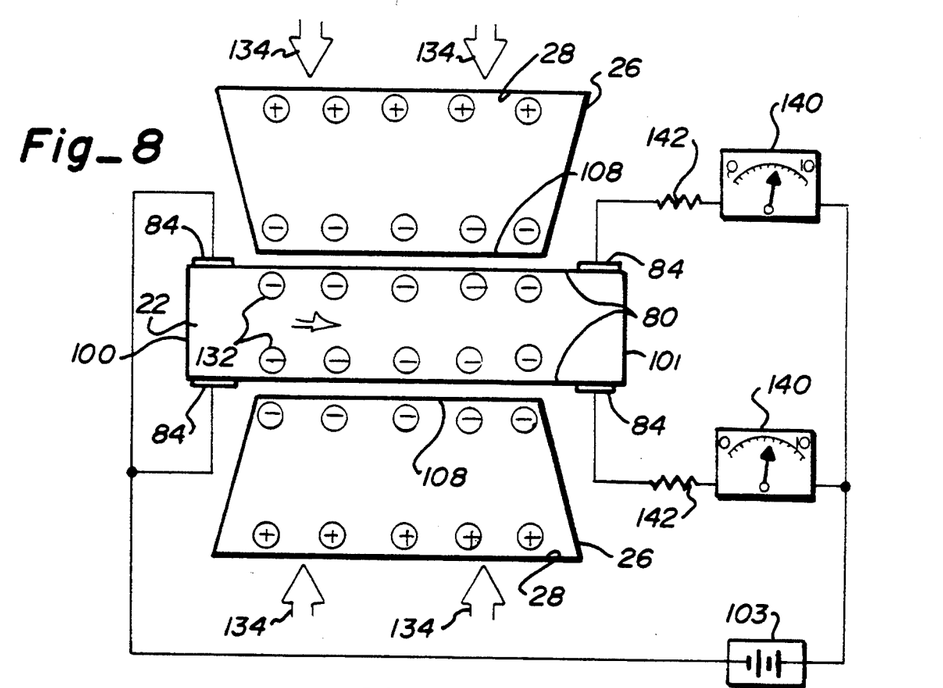
FIG. 8 is a simplified schematic representation of the transducer shown in FIGS. 1 through 7 wherein the piezoid elements are subjected to opposing forces of identical magnitude.
Figure 9:
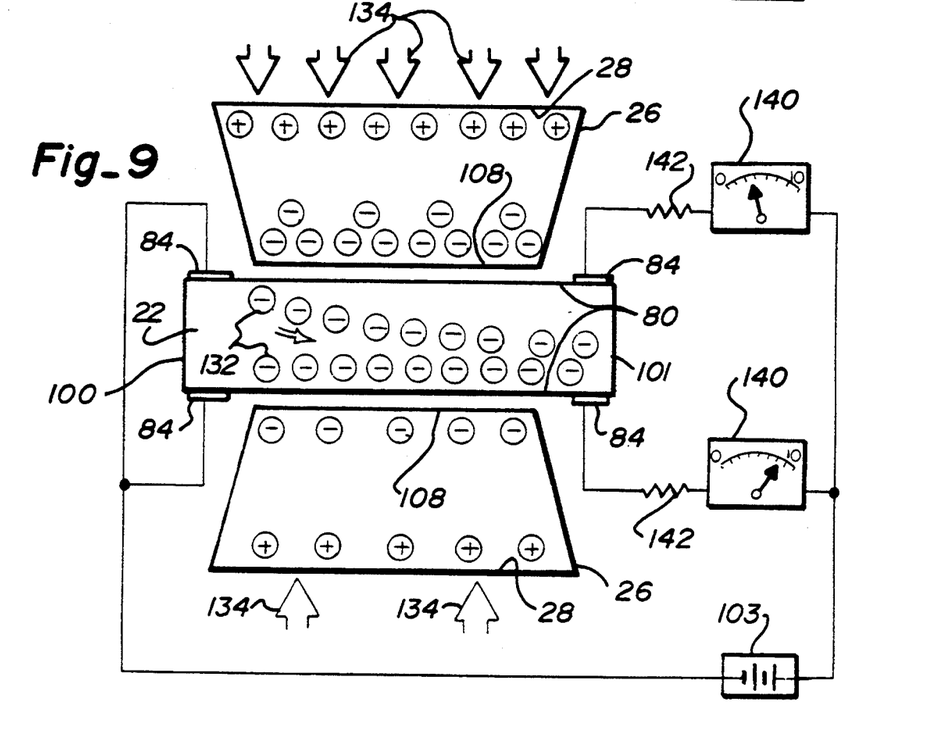
FIG. 9 is an additional simplified schematic representation of the transducer shown in FIGS. 1 through 7 in which the piezoid elements are subjected to opposing forces of differing magnitude.

As shown in FIG. 5, three electrical conductors 60 are connected to the metal contacts 88 of the wafer holder. As shown schematically in FIGS. 8 and 9, on a first longitudinal end 100 of the wafer 22, a current source 103 is connected to both the adjacent opposing metal contacts 84 of the wafer 22, whereas on an opposite end 101 of the wafer 22, current flowing from the first end 100 through the wafer 22 to the opposite end 101 is separately collected at the metal contacts 84 where it is separately collected and measured by measuring devices 140. Differing currents received at the metal contacts 84 on the opposite longitudinal end 101 of the wafer 22 are individually collected by separate electrical conductors 60 to determine the difference in the current collected at said opposite end 101 of the wafer 22 to measure the deflection of the current flowing through the wafer 22. Therefore, only a single electrical conductor 60 need be connected to both electrical contacts 88 at a first end 105 of the wafer holder 24 (FIG. 6) to connect the current source 103 with the metal contacts 84 on the wafer at the first longitudinal end 100 of the wafer 22, as shown schematically in FIGS. 8 and 9. Conversely, as shown in FIGS. 8 and 9, separate electrical conductors 60 are connected individually to the electrical contacts 88 at the opposite end 107 of the wafer holder 24 to separately receive current from the metal contacts 84 at the opposite longitudinal end 101 of the wafer 22.

The wafer 22 may be installed in the wafer holder 24 by depressing sides 87 of the flexible ring 86 at points 90° radially between the first end 105 and the opposite end 107 of the wafer holder 24 where the electrical contacts 88 are disposed, squeezing those sides 87 together close enough so that the resulting elongated, elliptical opening in the inner circumference 92 of the wafer holder 24 is large enough to accommodate the wafer 22. Both longitudinal ends 82 of the wafer 22 may then be inserted into the slot 96 at opposing sides of the wafer holder 24. It is important to ensure that the wafer 22 is inserted into the wafer holder 24 such that the first end 100 of the wafer 22 engages only the electrical contacts 88 on one side of the wafer holder 24 while the opposing end 101 of the wafer 22 engages the electrical contacts 88 only on the other side of the wafer holder 24 to ensure that the metal contacts 84 on the wafer 22 do not electrically bridge the electrical contacts 88 on opposing sides of the wafer holder 24. Once the wafer 22 is in place, the deforming pressure applied to the wafer holder 24 is released, permitting the wafer holder 24 to collapse to its undeformed, generally circular shape, securing the wafer 22 in the slot 96 therein.

To secure the wafer holder 24 in position in the main body 40 of the housing 20, the vertically-disposed outer circumference 94 of the ring 86 is concave. Specifically, as best shown in FIG. 5, the outer circumference 94 of the ring has sloping sides 104, the slope of which matches the slope of the sloping inner surfaces 54 of the end openings 50 in the main body 40 of the housing 20, which meet at a V-shaped notch 106. The V-shaped notch 106 receives the peaked midpoint 56 of the main body 40 of the housing 20 where the sloping surfaces 54 of the end openings 50 converge, and the V-shaped notch 106 straddles the peaked midpoint 56. The ring 86 is flexible enough so that it can be manipulated into place over the peaked midpoint 56 in the main body 40 of the housing 20, and the V-shaped notch 106 allows the wafer holder 24 to be positioned over the peaked midpoint 56 of the main body 40, holding the ring 86 in place while the transducer 12 is being assembled, thereby securing the wafer 22 generally equidistantly between the two piezoid elements 26.

The wafer holder 24 is designed to support the semiconductor wafer 22 equidistantly between the piezoid elements 26 as shown in FIGS. 2 and 5. Nonetheless, it should be noted that the strength of an electric field, such field emanating from an infinitely-large surface having a uniformly distributed charge, is not a function of the distance from that infinitely-large surface, and the strength of the field is constant regardless of the distance from such surface. As a function of the geometric properties of the preferred embodiment, although the inner-facing surfaces 108 of the piezoid elements 26 are not infinite surfaces, the ratio of the area of the inner-facing surfaces 108 of the piezoid elements 26 to the separation between the inner-facing surfaces 108 of the piezoid elements 26 and the wafer 22 is relatively high. Therefore, the inner-facing surfaces 108 of the piezoid elements 26 approximate infinite surfaces relative to the wafer 22. As a result, it can be presumed that the strength of the electric field generated by the piezoid elements 26 will not vary over the distance separating the inner-facing surfaces 108 of the piezoid elements 26 from the wafer 22. It has been demonstrated, therefore, that the performance of the transducer 12 should not be appreciably effected if the wafer 22 actually is not mounted equidistantly from the inner-facing surfaces 108 of each of the piezoid elements 26.

After the wafer 22 is installed in the wafer holder 24, the wafer holder 24 is installed in the housing 20 through one of the end openings 50 in the main body 40 thereof as previously described. With reference to FIG. 5, during assembly of the transducer 12, the electrical conductors 60 are first fed through the end opening 50 through which the wafer holder 24 will be installed, and the electrical conductors 60 are then inserted through the electrical access opening 16 through the side 62 of the main body 40 of the housing 20. Once extending outside the housing 20 and the assembly of the transducer 12 is completed, the conductors 60 can be connected to electrical measuring devices 140 illustrated schematically in FIGS. 8 and 9. During assembly, after the electrical conductors 60 are pulled more fully through the electrical access opening 16, the wafer holder 24 itself can be manipulated into position at the peaked midpoint 56 of the main body 40 of the housing 20. The flexible ring 86 of the wafer holder 24 is sufficiently compliant and flexible such that it can be manipulated to straddle the peaked midpoint 56 as shown in FIG. 5, where it will remain securely in place.

The piezoid elements 26 may consist of any number of asymmetrical crystalline substances which have been known to exhibit piezoelectric effects, i.e., generating a polarized electrical potential when subjected to pressure. In the preferred embodiment, the piezoid elements 26 are piezoelectric crystals formed of quartz. Quartz is a good choice for many applications inasmuch as it is relatively chemically inert and is resistant to the presence of many chemicals in the event of leakage of chemicals through the protective seal 30. Also, because of the uniformity of the crystal lattice of quartz, quartz inherently exhibits consistent piezoelectric effects with good repeatability in response to applied mechanical force. Further, quartz has a low thermal expansion coefficient, thus thermal expansion of quartz crystals in response to temperature changes will not affect the operation of the transducer 12.

Alternatively, the piezoid elements 26 need not be comprised of a single macrocrystalline material such as quartz. In fact, depending upon the environment in which the transducer 12 will be used, other piezoid materials may prove more desirable than quartz. For example, in high temperature environments in which the transducer may be subjected to temperatures in excess of 460° Celsius, quartz may not be the optimal choice due to the fact that quartz absorbs a high amount of energy and the crystalline lattice of the quartz may abruptly change from a then unstable alpha-quartz to high-temperature stable beta-quartz. The quartz's piezoelectric properties will exhibit a significant discontinuity upon such a transition. This discontinuity renders quartz a potentially unsuitable choice for applications at or about the alpha-to-beta transition temperature. On the other hand, various ceramic piezoid materials, such as Kezite K350 (a lead zirconate-titanate ceramic manufactured by Keramos, Inc., 5460 West 84th Street, Indianapolis, Ind.) comprising microcrystalline material may not exhibit such a similar discontinuity in their piezoelectric properties at that temperature, and may be, therefore, more suitable for applications at such temperatures.

Also, it should be noted that certain piezoid materials may generate a higher electric field strength per unit pressure, ultimately generating a stronger surface charge per unit applied stress. Other piezoid materials, such as rochelle salts, barium titanate compounds and ceramics will generate significant electrical fields in response to low pressures, making those substances a good choice for low pressure applications.

As previously stated, and as shown in FIGS. 2 and 7, the piezoid elements 26 are of a frusto-conical shape, matched in size and shape to the end openings 50 in the main body 40 of the housing 20. At any point along the vertical axis 44 of the transducer 12 (FIG. 7), the piezoid elements 26 will have a generally circular cross-sectional area. As shown in FIG. 2 and 5, the conical surface 110 of the piezoid elements 26 fit closely within the frusto-conical end openings 50, although the piezoid elements 26 do not directly engage the inner surfaces 54 of the main body 40 of the housing 20.

As shown in FIG. 5, the inner surfaces 54 of each end opening 50 are coated with a thin elastomeric coating 112 of a high-temperature, compressible, low friction elastomer, preferably of synthetic fluorine containing resin such as Teflon ®, a registered trademark of E. I. dupont de Nemours & Co, before the piezoid elements 26 are installed in the end openings 50. The elastomeric coating 112 serves two purposes. First, the elastomeric coating 112 acts as a sealant between the piezoid element 26 and the inner surfaces 54 of the mainbody 40 of the housing 20 to ensure a tight seal therebetween, the seal improving with increased pressure on the outward-facing surfaces 28 of the piezoid elements 26. The presence of the elastomeric coating 112 has no effect on the linear electrical response of the piezoid elements 26, as the pressure experienced by the piezoid elements is independent of the restraining medium, in this case the inner surfaces 54 of the housing 20 as covered by the elastomeric coating 112. It is important that the seal between the conical surfaces 110 of the piezoid elements 26 and the inner surfaces 54 of the end openings 50 of the housing 20 be pressure tight. If the seal is not pressure tight, pressure may pass between the piezoid element 26 and the housing 20, and impinge directly on the wafer 22 suspended therebetween. Most semiconductor materials will exhibit a piezoelectric effect, and pressure applied to the semiconductor surface will effect the electrical properties of the semiconductor. It is important to the accuracy of the present invention that the semiconductor wafer 22 itself not undergo any significant piezoelectric effects.

Second, because Teflon ® is a compressible, low-friction material, it will protect the piezoid elements 26 from performance degradation relating to hysteresis effects, hysteresis being a measure of the tendency of a system to return to periodic conditions. The low-friction, compressible elastomeric coating 112 allows the piezoid elements 26 to return to their original shape and position which would not be possible if the piezoid elements 26 were rigidly mounted in a holder. If the coating 112 were not a compressible, low-friction material, the introduction of externally applied pressure would deform the piezoid elements 26, but the piezoid materials 26 would not be readily able to return to their unstressed form once the pressure was removed, resulting in a latent polarization from the continued compression of the piezoid element 26, effecting the accuracy of the transducer. Ideally, when the piezoid elements 26 are unstressed and fitted into the main body 40 of the housing 20 within the elastomeric coating 112, the outward-facing surfaces 28 of the piezoid elements 26 should be flush with the outer end surfaces 52 of the main body 40 of the housing 20.

Use of a frusto-conical shape has three benefits. First, as pressure is applied to outward-facing surfaces 28 of the piezoid elements 26, that pressure will force the piezoid elements 26 further into the frusto-conically shaped end openings 50 and enhance the seal between the piezoid elements 26 and the inner surfaces 54 of the end openings 50. Second, depending on the angle of slope of the conical surfaces 110, the relative diameter of the piezoid elements at their outward 28 and inward facing 108 surfaces, and the thickness of the piezoid elements 26, forming the piezoid elements 26 in a frusto-conical shape effectively acts as a force multiplier. Shaping the piezoid elements 26 in this fashion creates a normal component of the applied mechanical force to be directed against the conical surfaces 110 of the piezoid elements 26, increasing the strain on the piezoid elements 26 and ultimately magnifying the strength of the resulting electrical potential developed between the faces of the piezoid elements 26 in response to an applied mechanical force. By magnifying the resultant electrical potential generated by the piezoid elements 26 in response to applied forces, the transducer 12 generally is made more sensitive to the applied forces. Third, the slope angle of the conical surfaces 110 of the piezoid elements 26, as measured from a reference plane perpendicular to the opposing surfaces of the piezoid element 26, should be chosen to be an angle greater than the internal angle of friction between the elastomeric coating 112 and the conical surface 110 of the frusto-conically shaped piezoid elements 26. Choosing the angle to be greater than the internal angle of friction between the conical surfaces 110 of the piezoid elements 26 and the elastomeric coating 112 applied between the sloping inner surfaces 54 of the end openings 50 and the conical surfaces 110 of the piezoid elements 26 will minimize friction between these surfaces to protect against hysteresis effects. Thus, shaping the conical surfaces 110 so that the angle of their slope is greater than the internal angle of friction between the piezoid element 26 and the elastomeric coating 112 works with the elastomeric coating 112 to reduce hysteresis effects.

Once the piezoid elements 26 are in place within the central portion of the holder, thin, flexible metal membranes comprising the protective seals 30 are installed across the outer end surfaces 52 of the main body 40 of the housing 20, and the piezoid elements 26. The protective seals 30, as shown in FIGS. 2 and 4, extend beyond the end openings 50 in the main body 40. The seals 30 serve two functions. First, the seals 30 serve as an additional seal between externally applied pressure and, ultimately, the semiconductor wafer 22 suspended between the piezoid elements 26. Second, the seals 30, which are thin enough to flex in response to externally applied pressure, serve to evenly distribute the externally applied pressure across the outer surfaces 28 of the piezoid elements 26.

With reference to FIG. 4, the seals 30 have a circular, planar surface 120 and a raised lip 122. The raised lip 122 is positioned to fit into the inward-facing groove 67 of the end caps 42 where the lip will engage the gasket 69 in the inward-facing groove 67, forming a seal between the seal 30 and the channel 14. Similarly, as shown in FIG. 4, the planar portion of the membrane 30 will rest on the O-ring 53 seated in the outward-facing groove 51 on the end surfaces 52 of the main body 40 of the housing 20, forming a seal between the seal 30 and the main body 40.

The seals 30 should be on the order of only 3 mils thick and hence readily deformable in response to applied pressure so as to push against the outward-facing surface 28 of the piezoid elements 26. The seals 30 preferably are formed of stainless steel, although it will be appreciated that, because the pressure source 74 may prove to be corrosive to stainless steel, another material may have to be selected. Also, in the preferred embodiment, once the O-ring gasket 53 is installed in the outward-facing groove 51, the gasket 69 is installed in the inward-facing groove 67, the seal 30 is installed and the end caps 42 are screw fit to the main body 40. The planar surface 120 of the seal 30 will rest on the O-ring gasket 53 at a distance of approximately 0.00001 of an inch above the plane of the outer end surface 52 of the main body 40 (not shown). The seal 30 can readily be deformed to span such a minute gap in response to applied pressure. Nonetheless, leaving a gap ensures that the seal 30 will not press against the piezoid element 26 when no pressure is applied, for such a latent force on the piezoid element 26 might adversely impact the accuracy of the transducer 12.

Once the seals 30 are in place, the end caps 42 may be screw-fitted onto the main body 40 of the housing 20 as previously described. As best shown in FIG. 4, as the end caps 42 are tightened, the gasket 69 in the inward-facing groove 67 of each of the end caps 42 will securely engage the lip 122 on the seal 30 to form a tight seal, and the contact between the gasket 69 and the lip 122 of the seal 30 will force the seal 30 securely against the O-ring gasket 53 in the outward-facing groove 67 of the main body 40 to form a tight seal therebetween. To further seal the transducer 12, a flexible plug 130, having a hollow, snug channel for the electrical conductors 60 to pass through, can be slipped over the electrical conductors 60 and forced into the electrical access opening 16 on the side 62 of the main body 40 of the housing 20. The transducer 12 is now assembled and ready to be used.

Generally, the principle of operation of the transducer 12 is based on the fact that the flow of unbound charged particles in a solid respond to applied electrical fields. Particularly, as is well known, particles of like charge repel each other, and, accordingly, an electric field will repel particles of like charge away from the source of the field, and will attract particles of opposite charge toward the source of the field, the extent to which the particles are attracted and repelled being proportional to the strength of the field.

In the present invention, an electric current, which is a flow of charged particles, is passed through the semiconductor wafer 22. Each of the piezoid elements 26 develops an electrical polarization between their opposing surfaces upon being subjected to mechanical force, the magnitude of the potential strength of the magnitude of the potential being proportional to the strength of the force applied to the piezoid elements 26. The effective deflection of the flow of current across the semiconductor wafer 22 in response to the magnitude of the electric polarization between opposing surfaces of the piezoid elements 26 in response to applied pressure then is indicative of the magnitude of the pressure applied to the piezoid elements 26.

In the preferred embodiment shown in FIG. 2, the transducer 12 employs two piezoid elements 26 disposed across opposing faces 80 of the semiconductor wafer 22 for use as a differential pressure transducer. As shown schematically in FIG. 8, a current source 103 is connected to the metal contacts 84 on the first longitudinal end 100 of the wafer 22 (to which the electrical contacts 88 in the holder 24 are commonly connected), the flow of current supplied by the current source 103 being represented by the charges 132 superimposed on the wafer 22. The magnitude of the pressure applied to the piezoid elements 26 is represented in FIG. 8 by the number of vectors 134 applied to the piezoid elements 26; the strength of the electrical potential developed by each piezoid element 26 in response to the applied pressure is represented by the density of charge symbols 132 appearing at the inward-facing surface 108 of each piezoid element 26. The equal number of vectors 134 applied to both piezoid elements 26 in FIG. 8 signifies that the magnitude of the pressure applied to each piezoid element 26 is equal. As a result, because equal pressure is applied to both piezoid elements 26, the strength of the electrical potentials developed by the piezoid elements 26 is equal, as shown in FIG. 8. Because the electrical potentials developed by the piezoid elements 26 are equivalent and will offset each other, as schematically depicted by the generally equal current measurement of the current measuring devices 140 in FIG. 8. Consequently, the flow of charged particles from the first longitudinal end 100 of the wafer 22 to which the current is applied to the opposite longitudinal end 101 of the wafer will experience no net deflection.

One should note that if, as a result of manufacture, a latent force is directed against one or both of the piezoid elements 26, such as a seal 30 pressing against a piezoid element 26 without any other intended pressure being applied thereto, there may be a latent electrical polarization between the opposing surfaces of one or both of the piezoid elements 26, causing an imbalance in the flow of charged particles across the semiconductor wafer 22 without any external pressure being applied thereto. Should this arise, load resistors 142 associated with the measuring equipment can be adjusted, e.g., via a potentiometer, to counteract the latent polarization and calibrate the transducer 12.

However, as shown in FIG. 9, if a greater pressure is applied to one piezoid element 26, its polarized electrical field will be greater in magnitude as compared to the field generated when a lesser pressure is applied as depicted in FIG. 8. Because like charges repel each other, the greater effective field strength emanating from the surface of the piezoid element 26 subjected to greater pressure will cause a net deflection of the flow of current across the wafer 22, as schematically represented by the current measuring devices 140 illustrating unequal current flow therethrough. Because the response of the piezoid elements 26 to the applied mechanical force is linear, the net result of the applied mechanical force on the flow of current across the wafer 22 also will be linear, and the difference in current can be used to determine the differential in applied pressure between the opposing piezoid elements 26.

Figure 10:
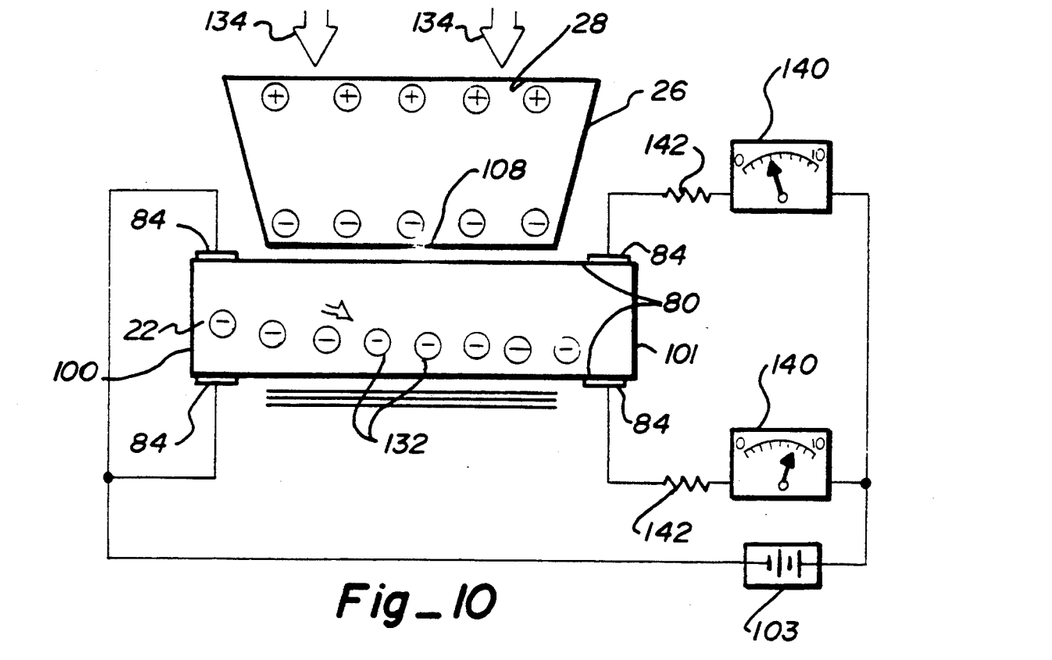
FIG. 10 is an additional simplified schematic representation of a piezoelectric force transducer in accordance with the present invention employing only a single piezoid element for use in sensing gauge or absolute pressure, with a force of relatively low magnitude applied to the piezoid element.
Figure 11:
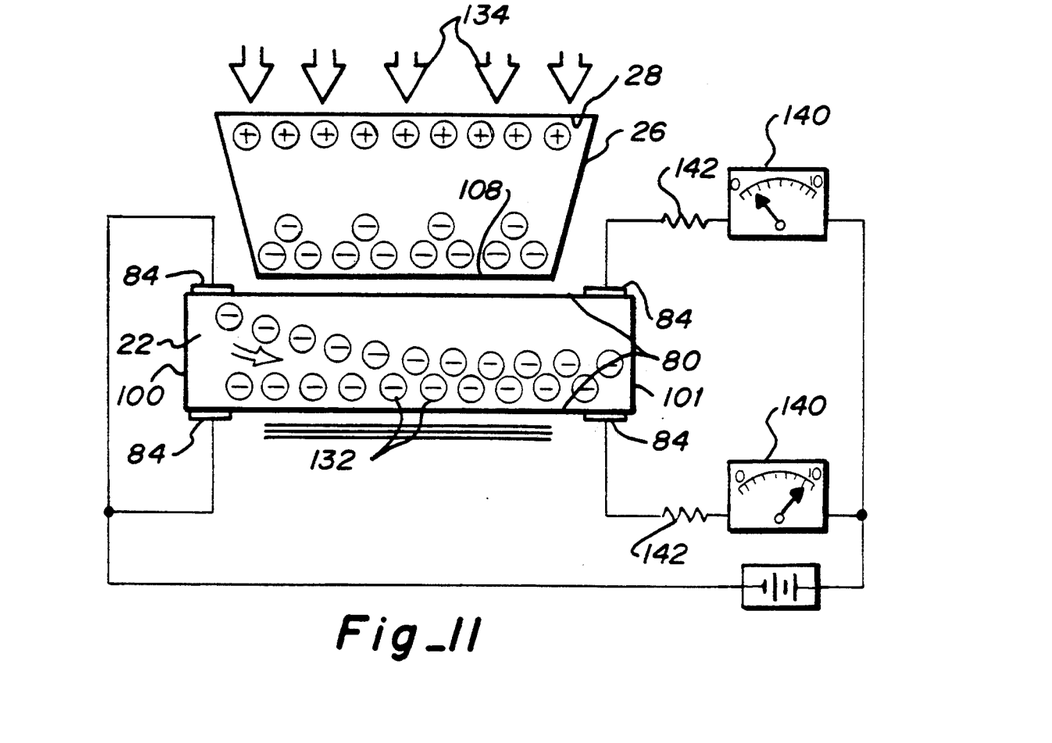
FIG. 11 is a further schematic representation of the transducer shown in FIG. 10 with a force of relatively higher magnitude, as compared to that applied in FIG. 10, applied to the piezoid element.

As shown in FIGS. 10 and 11, the principles of the present invention may be applied in an alternative embodiment of a transducer in accordance with the present invention utilizing only a single piezoid element 26 to measure absolute rather than differential pressure. In the embodiment depicted in FIGS. 10 and 11, like structure previously described with respect to the embodiment of FIGS. 1-9 is like numbered. In this embodiment, a current source 103 may also be applied to the metal contacts 84 at the first longitudinal end 100 of the wafer 22 (which engage the commonly connected electrical contacts 88 in the holder 24). A piezoid element 26 exposed to pressure will generate an electrical field which will cause some net deflection of the current flowing through the wafer 22, as schematically depicted by the non-zero current measured by the meter 140 in FIG. 10. As a greater pressure is applied to the piezoid element 26, as shown by the greater number of vectors 134 applied in FIG. 11, a greater net deflection of the current results as shown by the current measured by the current measuring devices 140 being greater in FIG. 11 in response to the greater applied pressure than the lesser current measured in FIG. 10 in response to the lesser applied pressure. Again, because the response of the piezoid element 26 is linear with respect to applied pressure, the concomitant linear alteration in current flow can be used to measure the pressure applied to the piezoid element 26.

It should also be noted that the transducer 12 of the present invention is useful for measuring mechanical forces other than pressure. For example, in the single-piezoid element embodiment shown in FIGS. 10 and 11, the transducer could be used as a microbalance to determine the weight of various objects. Rather than exposing the seal 30 covering the piezoid element 26 to a source of pressure, objects to be weighed could be placed directly upon the seal 30 or directly upon the piezoid element 26, and the weight of the objects would thereby strain the piezoid element 26 and result in a net deflection of the current applied to the wafer 22, the magnitude of the resultant difference in current flow being linearly related to the weight of the object.

The transducer of the present invention offers numerous advantages. The shape of the piezoid elements 26 and end openings 50 in which they are mounted act to multiply the force to which the piezoid elements are exposed, magnifying the resultant polarization of the electrical field and improving the sensitivity of the transducer. The application of the low-friction, compressible elastomeric coating 112 to the surfaces receiving the piezoid elements 26 improves the accuracy and repeatability of the transducer by serving to eliminate hysteresis effects. Orientation of the transducer, shock, and exposure to high pressure (from zero to 10,000 p.s.i in a single device) will not effect the capability of the transducer. The transducer will operate effectively over a wide range of temperatures and has the advantage of being self-compensating in response to temperature changes. The temperature of the semiconductor wafer 22 will effect its conductivity, but because the wafer 22 is a thin body, there will not be an appreciable temperature gradient between faces of the wafer 22. Accordingly, the conductivity of the wafer 22 will be effected equally by temperature changes, and thus, the net conductivity between its faces will remain unchanged. Further, the electric polarization developed by each of the piezoid elements 26 is effectively temperature independent. Therefore, if the piezoid elements 26 are exposed to pressure sources at different temperatures, such will not effect the resultant polarization. Also, because of its relatively simple design, employing relatively few parts and using a non-composite, single-region semiconductor, the manufacturing cost of the transducer is relatively low and the transducer is rugged and highly durable. Further, the transducer consumes little power, making it suitable for a wide range of applications.

Presently preferred embodiments of the present invention have been described with a degree of particularity. This description has been made by way of preferred examples and is based on a present understanding of knowledge available regarding the invention. It should be understood, however, that the scope of the present invention is defined by the following claims, and not necessarily by the foregoing detailed description of the preferred embodiments.

The invention claimed is:

1. An apparatus for measuring a magnitude of a mechanical force applied to a piezoid element, wherein the piezoid element has opposing proximal force receiving and distal charge deflecting ends thereof for developing an electrical polarization in response to the applied force, the polarization having a potential whose magnitude is representative of the magnitude of the mechanical force applied, the apparatus comprising:
   a wafer of semiconductor material, the wafer having oppositely disposed first and second surfaces thereof and opposing longitudinal ends;
   a plurality of electrical conducting means for supplying a current of charged particles to the wafer at one longitudinal end and for separately receiving the charged particles at an opposite longitudinal end of the wafer adjoining each of the first and second surfaces thereof;
   the distal charge deflecting end of the piezoid element is disposed toward the first surface of the wafer wherein a polarity at the distal charge deflecting end of the piezoid element will cause charged particles having a like polarity to be repelled from the first surface of the wafer and cause charged particles having an opposite polarity to be attracted to the first surface of the wafer in proportion to the magnitude of the potential at the distal charge deflecting end of the piezoid element, whereby measuring the charged particles received toward each of the first and second surfaces at the opposite longitudinal end of the wafer, the magnitude of the polarization representative of the magnitude of the mechanical force applied, can be measured; and
   a sealed housing for housing the piezoid element and the wafer therein, the sealed housing for allowing the mechanical force to be applied to the piezoid element but not to the wafer whereby the wafer will not exhibit any intrinsic piezoelectric effects as a result of the mechanical force being applied directly to the wafer.

2. An apparatus as defined in claim 1 wherein the piezoid element is frusto-conically shaped, a narrower end of the frusto-conically shaped piezoid element being the distal charge deflecting end thereof, and the frusto-conically shaped piezoid element is disposed in a frusto-conically shaped opening in the housing, the opening having a narrower end disposed toward the wafer.

3. An apparatus as defined in claim 1 wherein the piezoid element is separated from the housing by a low-friction, compressible layer.

4. An apparatus as defined in claim 1 wherein at least one of the conducting means is connected adjacent to the longitudinal ends of the wafer.

5. An apparatus as defined in claim 1 wherein at least one of the conducting means is connected to one of the surfaces of the wafer.

6. An apparatus for measuring net magnitude of a plurality of mechanical forces, each of said mechanical forces being applied separately to each of a plurality of piezoid elements, wherein the piezoid elements each have opposing ends thereof which develop an electrical polarization, the opposing ends having an opposite polarity, the polarization having a potential whose magnitude is representative of the magnitude of the mechanical force applied, the apparatus comprising:
   a wafer of semiconductor material, the wafer having a plurality of surfaces and opposing longitudinal ends;
   a plurality of electrical conducting means for supplying a current of charged particles to the wafer at one longitudinal end and for separately receiving the charged particles at an opposite longitudinal end of the wafer toward each of the surfaces;
   an adjacent end of each of the piezoid elements is disposed toward an adjacent surface of the wafer wherein a polarity at the adjacent end of the piezoid element will cause charged particles having a like polarity to be repelled from the adjacent surface of the wafer and cause charged particles having an opposite polarity to be attracted to the adjacent surface of the wafer in proportion to a net magnitude of the potential at the adjacent end of the piezoid element, whereby measuring the charged particles received toward each of the surfaces of the wafer at the opposite longitudinal end of the wafer, the net magnitude of the polarization, representative of the net magnitude of the mechanical force applied, can be measured; and
   a sealed housing for housing the piezoid elements and the wafer therein, the sealed housing for allowing the mechanical forces to be applied to the piezoid elements but not to the wafer whereby the wafer will not exhibit any intrinsic piezoelectric effects as a result of the mechanical forces being applied directly to the wafer.

7. An apparatus as defined in claim 6 wherein the piezoid elements are frusto-conically shaped, a narrower end of each of the frusto-conically shaped piezoid elements being the adjacent end thereof, and the frusto-conically shaped piezoid elements are disposed in frusto-conically shaped openings in the housing, each of the openings having a narrower end disposed toward the wafer.

8. An apparatus as defined in claim 6 wherein the piezoid elements each are separated from the housing by a low-friction compressible layer.

9. An apparatus as defined in claim 6 wherein at least one of the conducting means is connected adjacent to the longitudinal ends of the wafer.

10. An apparatus as defined in claim 6 wherein at least one of the conducting means is connected to one of the surfaces of the wafer.

11. An apparatus for measuring magnitude of a mechanical force applied to a piezoid element, wherein the piezoid element has opposing proximal force receiving and distal charge deflecting ends thereof for developing an electrical polarization in response to the applied force, the polarization having a potential whose magnitude is representative of the magnitude of the mechanical force applied, the apparatus comprising:
a charged-particle transmission medium capable of sustaining an electric field internally, the transmission medium having a plurality of surfaces and opposing longitudinal ends;
a plurality of electrical conducting means for supplying a current of charged particles to the transmission medium at one longitudinal end and for separately receiving the charged particles at an opposite longitudinal end of the transmission medium at each of the surfaces thereof;
the distal charge deflecting end of the piezoid element is disposed toward an adjacent surface of the transmission medium wherein a polarity at the distal charge deflecting end of the piezoid element will cause charged particles having a like polarity to be repelled from the adjacent surface of the transmission medium and cause charge particles having an opposite polarity to be attracted toward the adjacent surface of the transmission medium in proportion to the magnitude of the polarization at the adjacent surface of the transmission medium, whereby measuring the charged particles received toward each of the surfaces at the opposite longitudinal end of the transmission medium, the magnitude of the polarization representative of the magnitude of the mechanical forces applied, can be measured; and
a sealed housing for housing the charged-particle transmission medium and the piezoid element therein, the sealed housing for allowing the mechanical forces to be applied to the piezoid element but not to the transmission medium whereby the transmission medium will not exhibit any intrinsic piezoelectric effects as a result of the mechanical force being applied directly to the transmission medium.

12. An apparatus as defined in claim 11 wherein the piezoid element is frusto-conically shaped, a narrower end of the frusto-conically shaped piezoid element being the distal charge deflecting end thereof, and the frusto-conically shaped piezoid element is disposed in a frusto-conically shaped opening in the housing, the openings having a narrower end disposed toward the transmission medium.

13. An apparatus as defined in claim 11 wherein the piezoid element is separated from the housing by a low-friction, compressible layer.

14. An apparatus as defined in claim 11 wherein at least one of the conducting means is connected adjacent to the longitudinal ends of the wafer.

15. An apparatus as defined in claim 11 wherein at least one of the conducting means is connected to one of the surfaces of the wafer.

16. An apparatus as defined in claim 11 wherein the transmission medium is a semiconductor wafer.

17. An apparatus as defined in claim 11 wherein the transmission medium is an electron beam vacuum tube wherein the conducting means are connected to a cathode for supplying a current of charged particles at one longitudinal end and to separate anodes at the opposite longitudinal end for separately receiving the charged particles at the opposite longitudinal end of the transmission medium.

18. An apparatus for measuring net magnitude of a plurality of mechanical forces, each of said mechanical forces being applied separately to each of a plurality of piezoid elements, wherein the piezoid elements each have opposing proximal force receiving and distal charge deflecting ends thereof for developing an electrical polarization in response to the applied force, the opposing surfaces each having an opposite polarity, the polarization having a potential whose magnitude is representative of the magnitude of the mechanical force applied, the apparatus comprising:
a charged-particle transmission medium capable of sustaining an electric field internally, the transmission medium having a plurality of surfaces and opposing longitudinal ends;
a plurality of electrical conducting means for supplying a current of charged particles to the transmission medium at one longitudinal end and for separately receiving the charged particles at an opposite longitudinal end of the transmission medium at each of the primary and secondary surfaces thereof;
the distal charge deflecting end of each of the piezoid elements is disposed adjacent to an adjacent surface of the transmission medium wherein a polarity at the distal charge deflecting end of the piezoid element will cause charged particles having a like polarity to be repelled from the adjacent surface of the transmission medium and cause charged particles having an opposite polarity to be attracted toward the adjacent surface of the transmission medium in proportion to a net magnitude of the potential at the adjacent surface, whereby measuring the charged particles received toward each of the surfaces at the opposite longitudinal end of the wafer the net magnitude of the polarization, representative of the net magnitude of the mechanical force applied, can be measured; and
a sealed housing for housing the piezoid elements and the transmission medium therein, said sealed housing for allowing the mechanical forces to be applied to the piezoid elements but not to the transmission medium whereby the transmission medium will not exhibit any intrinsic piezoelectric effects as a result of the mechanical force being applied directly to the transmission medium.

19. An apparatus as defined in claim 18 wherein the piezoid element is frusto-conically shaped, a narrower end of the frusto-conically shaped piezoid element being the distal charge deflecting end, and the frusto-conically shaped piezoid element is disposed in a frusto-conically shaped opening in the housing, the opening having a narrower end disposed toward the transmission medium.

20. An apparatus as defined in claim 18 wherein at least one of the conducting means is connected adjacent to the longitudinal ends of the transmission medium.

21. An apparatus as defined in claim 18 wherein at least one of the conducting means is connected to one of the surfaces of the transmission medium.

22. An apparatus as defined in claim 18 wherein the transmission medium is a semiconductor wafer.

23. An apparatus as defined in claim 18 wherein the transmission medium is an electron beam vacuum tube wherein the conducting means are connected to a cathode for supplying a current of charged particles at one longitudinal end and the conducting means are connected to separate anodes at the opposite longitudinal end for separately receiving the charged particles at the opposite longitudinal end of the transmission medium.

24. A method for measuring magnitude of a mechanical force applied to a piezoid element, wherein the piezoid element has opposing proximal force receiving and distal charge deflecting ends thereof for developing an electrical polarization in response to an applied force, the polarization having a potential whose magnitude is representative of the magnitude of the mechanical force applied, the method comprising the steps of:
  providing a charged-particle transmission medium capable of sustaining an electric field internally, the transmission medium having a plurality of surfaces and opposing longitudinal ends;
  disposing the distal charge deflecting end of the piezoid element adjacent an adjacent surface of the transmission medium wherein a polarity at the distal charge deflecting end will cause charged particles having a like polarity to be repelled from the adjacent surface of the transmission medium, and cause charged particles having an opposite polarity to be attracted toward the adjacent surface of the transmission medium in proportion to the magnitude of the potential at the adjacent surface;
  supplying a current charged particles to the transmission medium at one longitudinal end and for separately receiving the charged particles at an opposite longitudinal end of the transmission medium toward each of the surfaces of the transmission medium;
  measuring the charged particles received toward each of the surfaces of the transmission medium at the opposite longitudinal end of the transmission medium to determine the magnitude of the potential which is representative of the magnitude of the mechanical force applied; and
  insulating the transmission medium from direct exposure to the mechanical force whereby the transmission medium will not exhibit any intrinsic piezoelectric effects as a result of the mechanical force being applied directly to the transmission medium.

25. A method as defined in claim 24 further comprising the steps of forming the piezoid element into a frusto-conical shape, a narrower end of the frusto-conically shaped piezoid element being the distal charge deflecting end, and mounting the frusto-conically shaped piezoid element in a frusto-conically shaped mounting, the mounting having a narrower end disposed toward the transmission medium.

26. A method as defined in claim 24 further comprising the step of separating the piezoid element from the mounting with a low-friction, compressible layer.

27. A method as defined in claim 24 further comprising the step of connecting at least one of the conducting means adjacent to the longitudinal ends of the transmission medium.

28. A method as defined in claim 24 further comprising the step of connecting at least one of the conducting means to one of the surfaces of the transmission medium.

29. A method for measuring magnitude of a plurality of mechanical forces, each of said forces being applied separately to each of a plurality of piezoid elements, wherein the piezoid elements each have opposing ends thereof for developing an electrical polarization in response to the applied mechanical forces, the polarization of each of the piezoid elements having a potential whose magnitude is representative of the magnitude of the mechanical force applied to the force receiving end thereof, the method comprising the steps of:
  providing a charged-particle transmission medium capable of sustaining an electric field internally, the transmission medium having a plurality of surfaces and opposing longitudinal ends;
  disposing an adjacent end of each of the piezoid elements toward an adjacent surface of the transmission medium wherein a polarity at the distal charge deflecting end will cause charged particles having a like polarity to be repelled from the adjacent surface of the transmission medium, and caused charged particles having an opposite polarity to be attracted toward the adjacent surface of the transmission medium, in proportion to the magnitude of the potential at the adjacent surface;
  supplying a current of charged particles to the transmission medium at one longitudinal end and for separately receiving the charged particles at an opposite longitudinal end of the transmission medium toward each of the surfaces;
  measuring the charged particles received toward each of the surfaces at the opposite longitudinal end of the transmission medium to determine the net magnitude of the polarization which is representative of the net magnitude of the mechanical force applied; and
  insulating the transmission medium from direct exposure to the mechanical forces whereby the transmission medium will not exhibit any intrinsic piezoelectric effects as a result of the mechanical forces being applied directly to the transmission medium.

30. A method as defined in claim 29 further comprising the steps of forming each of the piezoid elements into frusto-conical shapes, a narrower end being the adjacent end thereof, and mounting each of the frusto-conically shaped piezoid elements in a frusto-conically shaped mounting, the mounting having a narrower end disposed toward the transmission medium.

31. A method as defined in claim 29 further comprising the step of connecting at least one of the conducting means adjacent to the longitudinal ends of the wafer.

32. A method as defined in claim 29 further comprising the step of connecting at least one of the conducting means to one of the surfaces of the wafer.

* * * * *